United States Patent [19]

O'Malley

[11] Patent Number: 4,984,704

[45] Date of Patent: Jan. 15, 1991

[54] TRASH CONTAINER SUPPORTING APPARATUS

[76] Inventor: James O'Malley, 110 DuBois Rd., Glassboro, N.J. 08028

[21] Appl. No.: 395,542

[22] Filed: Aug. 18, 1989

[51] Int. Cl.$^5$ .............................................. B65D 25/22
[52] U.S. Cl. ..................................... 220/23.4; 211/81; 220/23.4; 220/410; 280/47.19
[58] Field of Search .......................... 211/71, 78, 81; 220/1 T, 23.4, 408, 410; 280/30, 47.17, 47.18, 47.19, 47.24, 47.26, 47.28

[56] References Cited

U.S. PATENT DOCUMENTS

| | | | |
|---|---|---|---|
| 452,969 | 5/1891 | O'Neill | 280/47.19 |
| 738,572 | 9/1903 | Reid et al. | 211/81 |
| 1,823,396 | 9/1931 | Goulet | 211/71 |
| 3,052,484 | 9/1962 | Huffman et al. | 280/47.19 |
| 3,675,940 | 7/1972 | Crookston | 280/47.26 |
| 4,682,699 | 7/1987 | Ertley | 211/71 |
| 4,821,903 | 4/1989 | Hayes | 280/47.19 |

FOREIGN PATENT DOCUMENTS

| | | | |
|---|---|---|---|
| 1002661 | 3/1952 | France | 280/47.19 |
| 0085662 | 6/1955 | Norway | 280/47.18 |
| 0732276 | 6/1955 | United Kingdom | 280/47.19 |

*Primary Examiner*—Jimmy G. Foster
*Attorney, Agent, or Firm*—Charles F. Duffield

[57] ABSTRACT

A trash container supporting apparatus for supporting a plurality of trash containers permitting separation of different categories of trash for recycling purposes. The supporting apparatus includes a frame and a plurality of trash container supports pivotally interconnected to the trash container frame and adapted to receive and support a plurality of trash containers. The trash container frame further includes an axle and pair of wheels positioned at one end and a combination handle and stand positioned at the opposite end of the trash container frame. The frame may be tilted between a generally vertical position for conservation of space and a horizontal position while the trash containers remain in a generally vertical position to retain the trash.

4 Claims, 4 Drawing Sheets

TRASH CONTAINER SUPPORTING APPARATUS

BACKGROUND OF INVENTION

The present invention relates to supporting apparatus for supporting trash containers and, more particularly, to supporting apparatus for supporting a plurality of trash containers for the purpose of separation of different categories of trash for recycling.

The problem of trash collection and disposal has become an extremely acute problem in the United States. A substantial majority of the various municipal, county and/or state authorities responsible for trash collection have enacted laws and ordinances making trash separation by categories, i.e. glass, metal cans, paper and garbage, mandatory by the party disposing of the trash.

A typical situation is one in which the particular authority involved will distribute to the various households separate buckets or containers for each category of trash such as metal cans, bottles, paper and general garbage. Under such circumstances, the household individual involved will have as many as four separate trash containers sitting around the kitchen or utility room. This situation is inconvenient, unsightly and unsanitary. Further, upon placement of the trash for pickup, the individual involved must carry four separate containers to the curb or other disposal area.

Mandatory recycling has given rise to the need for a device which can store the plurality of separate trash containers required in an efficient and space saving manner and also provide an easy means by which the plurality of containers can be removed from the household or other position involved to the point of pickup. There is also a need for a device which provides for easy identification and removal of the containers for collection purposes.

SUMMARY OF INVENTION

The trash container supporting apparatus of the present invention overcomes the disadvantages of the separate trash containers for the various categories of trash and provides a device within which a plurality of trash containers may be conveniently and efficiently stored within the household while being filled with the various categories of trash and also provides a device for easily and conveniently moving the plurality of trash containers from the household to the point of pickup and disposal.

The trash container supporting apparatus of the present invention includes a trash container frame within which there is supported a plurality of trash container supports which are pivotally interconnected to the trash container frame and each adapted to support a separate trash container.

The trash container frame includes an axle and wheel assembly at one end thereof and a combination handle and stand at the opposite end thereof. The end of the trash container frame at which the wheel and axle assembly is positioned is of such a configuration that the trash container frame, when tilted to a generally vertical position, will be self-supporting in that position. Additionally, when the trash container frame is tilted to a generally horizontal position, the combination handle and stand will maintain the frame in that position.

In use, the trash container frame and its included trash containers are tilted to the generally vertical position whereupon the pivotal action of the plurality of trash container supports will permit the trash containers to remain in a generally vertical position whereupon they can be filled. The trash container frame and its included trash containers and the contents thereof may be conveniently wheeled to the point of pickup and disposal whereupon the trash container frame is tilted to the generally horizontal position for ease of removal of the trash containers which remain in a generally vertical position due to the pivotal action of the plurality of trash container supports.

Other objects and advantages of the trash container supporting apparatus of the present invention will become apparent from the detailed description of the invention taken in conjunction with the drawings which follow hereafter.

DETAILED DESCRIPTION OF INVENTION

Figure 6:
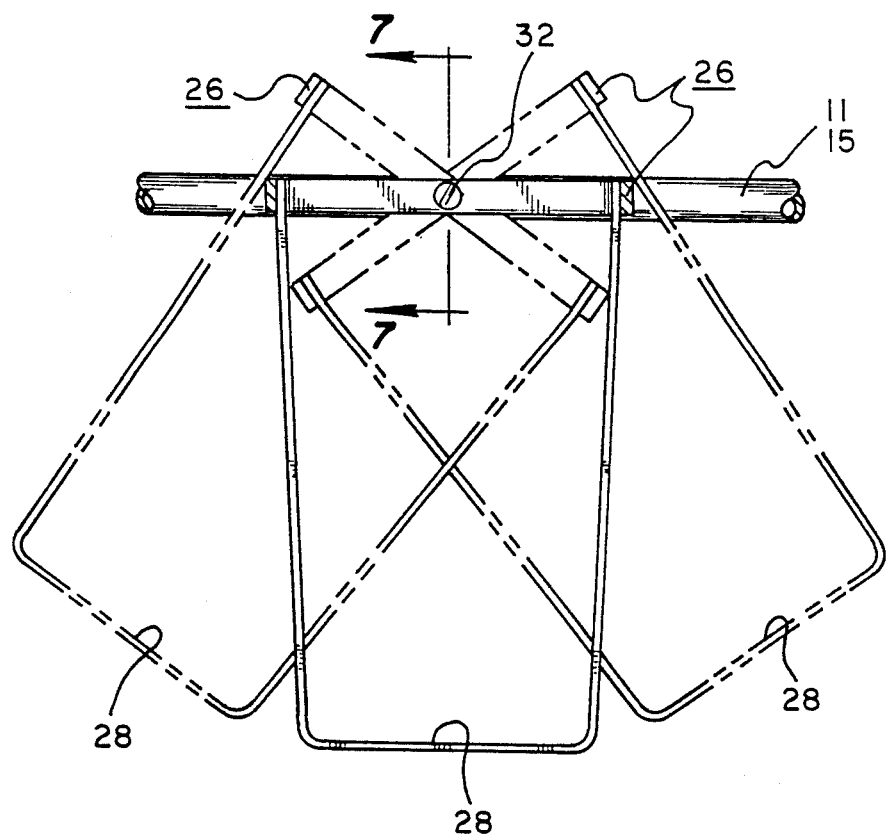
FIG. 6 is an elevational view in section of the trash container support of the trash container supporting apparatus of the present invention.
Figure 7:
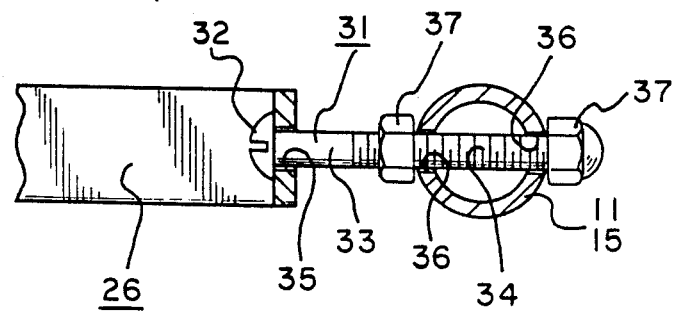
FIG. 7 is a sectional view of the pivotal interconnection of the trash container support with the trash container frame taken along the lines 7—7 of FIG. 6.

The trash container supporting apparatus of the present invention is shown generally in FIGS. 1-5 and the details of the trash container supports and their pivotal action is shown specifically in FIGS. 6 and 7. The description of the trash container supporting apparatus of the present invention will be made generally in respect to FIGS. 1-5 without specific reference to a particular figure except where deemed specifically advantageous.

The trash container supporting apparatus of the present invention includes a trash container frame 10 of a generally rectangular configuration. The frame 10 may be constructed or formed hollow tubing such as aluminum or steel tubing.

The frame 10 includes opposed side supports 11 which, at the rear end of the frame 10, terminate in a rear cross support 12. The opposite ends of the opposed side supports 11 are formed into vertically extending supports 13. The vertical supports 13 form an angle of 10 degrees with the opposed side supports 11.

The vertically extending supports 13 are extended into diagonal supports 14. The diagonal supports 14 terminate at formed ends 15. The formed ends 15 are bolted onto the opposed side supports 11 to provide for rigidity.

An upper cross support 16 interconnects the front ends of the opposed side supports 11. In a like manner, a lower cross support 17 interconnects the vertically extending supports 13 to provide rigidity for the front portion of the trash container frame.

Generally at the juncture of the vertically extending supports 13 and diagonal supports 14, a wheel and axle assembly is provided. The wheel and axle assembly includes an axle 18 secured into the diagonal supports 14. A pair of wheels 19 are journaled upon the axle 18 in a conventional manner.

Figure 4:
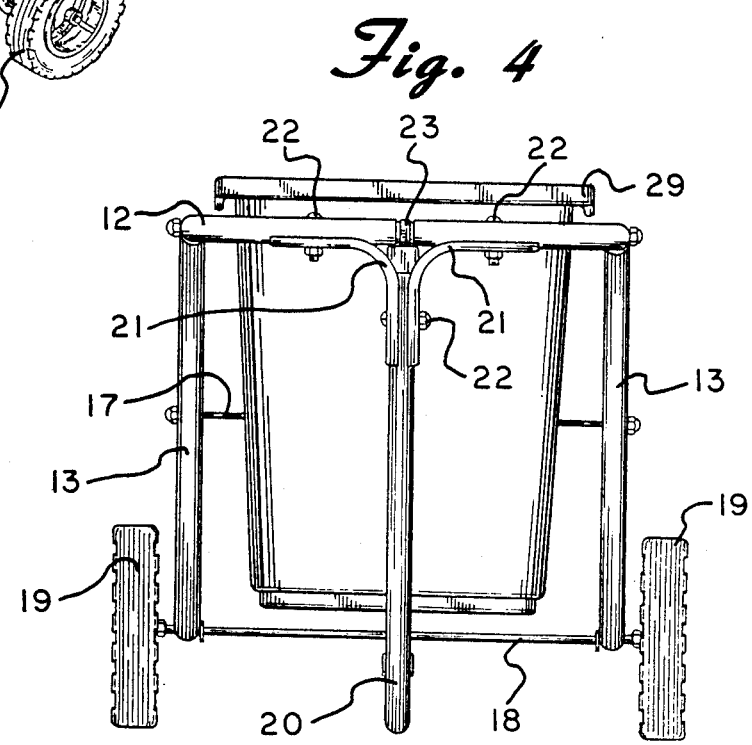
FIG. 4 is an end view of the trash container supporting apparatus of the present invention taken along the lines 4—4 of FIG. 3.
Figure 5:
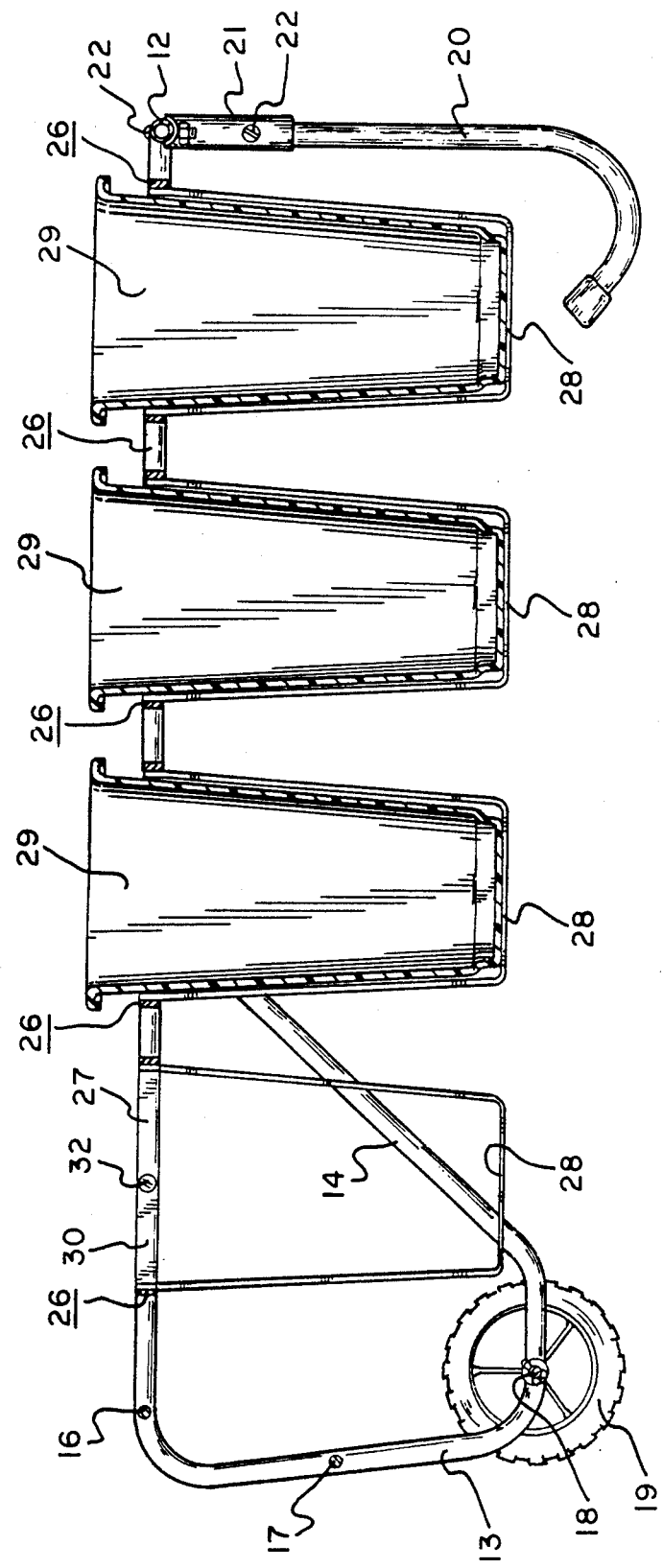
FIG. 5 is a sectional side view of the trash container supporting apparatus of the present invention taken along the lines 5—5 of FIG. 3.

The rear cross support 12, as best shown in FIG. 4, has secured thereto a combination handle and stand 20. The combination handle and stand 20 is secured to the cross member 12 by a pair of angle supports 21 which are bolted by suitable threaded fastening means 22 to both the combination handle and support stand 20 and the rear cross support 12.

For the purposes of ease of fabrication of the trash container frame 10, the frame may be formed of two separate halves each consisting of a diagonal support 14, vertically extending support 13, opposed side support 11 and one-half of the rear cross support. In this case, each half of the rear cross support 12 will have an appropriate bushing 23 inserted into each end of the one-half rear cross support 12 to provide a rigid interconnection of each half of the trash container frame 10.

A plurality of trash container supports 26 are pivotally interconnected to the opposed side supports 11. In the particular embodiment shown, four such trash container supports are provided.

Each trash container support 26 includes a generally rectangular horizontal retainer 27. Interconnected to the horizontal retainer 27 is a vertically extending vertical retainer 28. The width and length of the horizontal retainer 27 and the depth of the vertical retainer 28 are generally that of a standard trash container 29 which is adapted to receive the trash container 29. By way of example but not intended as a limitation, a standard trash container 29 may be of the approximate size of 9" by 15" at the opening and of a depth of 17".

The pivotal interconnection of the trash container supports is best shown in FIGS. 6 and 7 of the drawings. Each end 30 of the horizontal retainer 27, at its midsection, is retained in place for pivotal action relative to the opposed side supports 11 by means of a pivot pin 31. The pivot pin 31 includes an enlarged head 32, a smooth smaller diameter shank portion 33 and a threaded portion 34.

In assembly, the pivot pin is inserted through an aperture 35 in the end 30 of the horizontal retainer 27. The threaded portion 34 of the pivot pin extends through a drilling 36 in each opposed side support 11. A pair of threaded nuts 37 are provided to tighten the pivot pin and retain it in place within the opposed side support 11. In this manner, each trash container support is permitted to pivot relative to the trash container frame 10 and thus the trash containers 29 within the trash container supports 26 will always maintain a vertical position irrespective of the angulation of the trash container frame 10.

Figure 1:
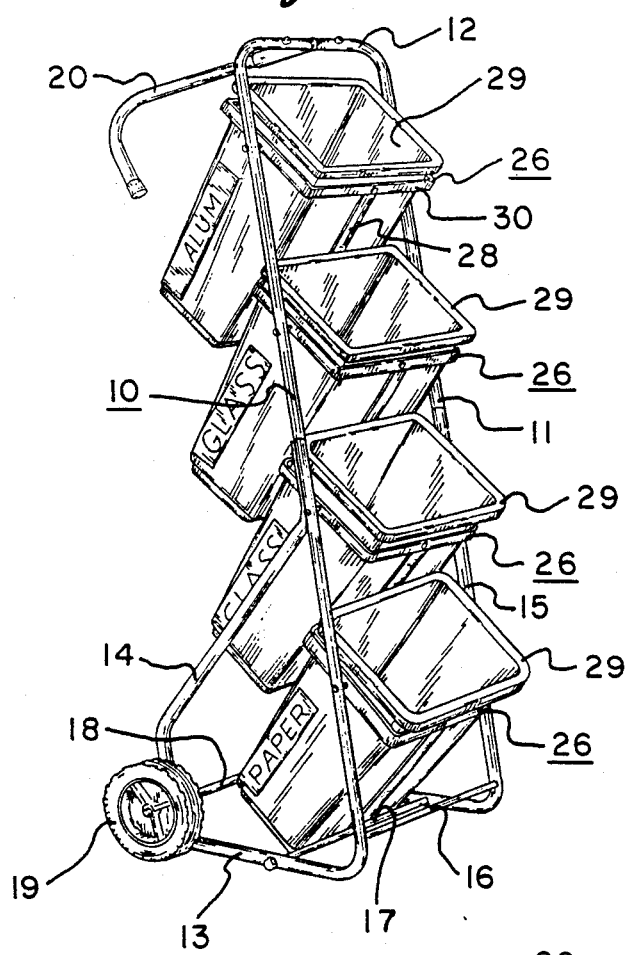
FIG. 1 is a perspective view of the trash container supporting apparatus of the present invention shown in vertical stored position.

When the trash container supporting apparatus of the present invention is in use in a home or other indoor facility, the frame will be tilted to its generally upright or vertical position as shown in FIG. 1 of the drawings. In this position, the vertically extending supports come into contact with the floor of the facility and provide a stable platform for maintaining the trash container frame and its included trash containers in the generally vertically disposed position. The forwardmost trash container will engage the lower cross support and maintain the trash container in a slight angle from vertical of approximately 60 degrees. The adjacent trash containers engage the rear portion of the trash container in front of them. In this manner, all of the trash containers align with respect to each other at the same approximate vertical angle. At this angle, the openings of the trash containers are readily exposed and easily in view for the receipt of their respective categories of trash. However, the vertical angle of the opposed side supports is sufficient that the entire trash container frame, trash container supports and their included trash containers take up very little more floor space than a single trash container.

Figure 2:
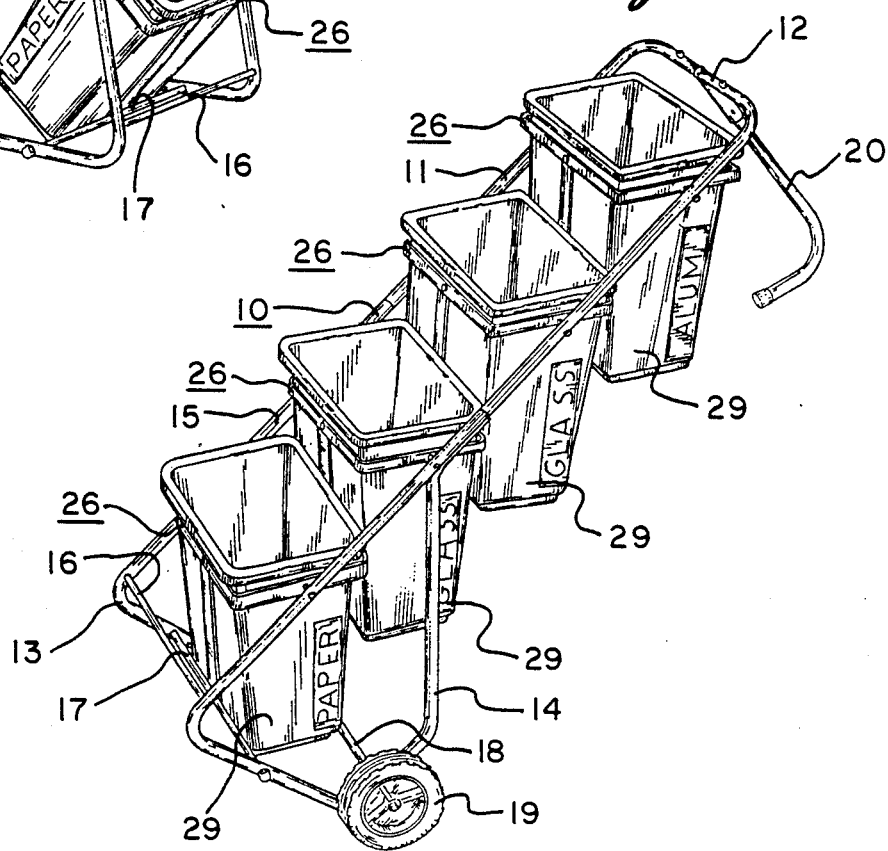
FIG. 2 is a perspective view of the trash container supporting apparatus of the present invention shown in tilted position for movement upon the axle and wheel assembly.

When the trash containers have been filled, the user of the trash container supporting apparatus of the present invention need only tilt the trash container frame backwardly by means of grasping the combination handle and stand to thus bring the wheels of the trash container supporting apparatus into contact with the floor of the facility as shown in FIG. 2. In this position, the trash container supporting apparatus and included trash within the trash containers may be easily wheeled to the pickup and disposal area such as to the curb of a street.

Figure 3:
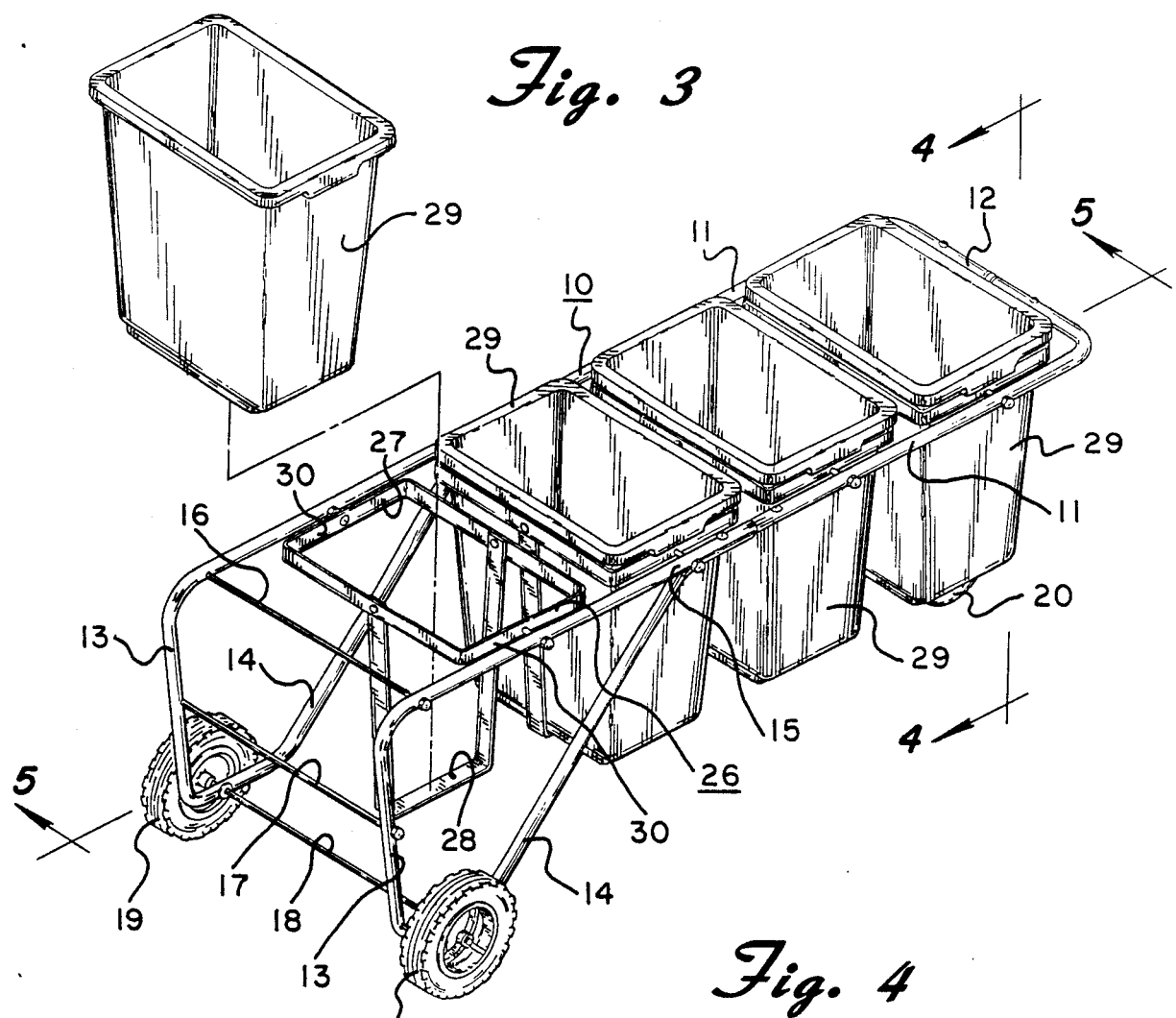
FIG. 3 is a perspective view of the trash container supporting apparatus of the present invention shown in generally horizontal position for pickup and disposal of the trash.

Once the trash container supporting apparatus has reached the point of pickup and disposal, the apparatus is titled downwardly to its horizontal position as shown in FIGS. 3 and 4. The combination handle and stand provide the support for the apparatus in the horizontal position. When disposed in the horizontal position at the curb, the trash containers are readily accessible to the crew picking up the trash.

From the foregoing it will be appreciated that the trash container supporting apparatus of the present invention provides a novel and unique means by which a plurality of trash containers used for recycling of trash may be stored within a house or other facility without consuming too great a space while maintaining the trash containers in a neat and orderly fashion. Additionally, the trash container supporting apparatus of the present invention also provides a quick, convenient and easy means by which the trash containers may be moved from the household to the point of pickup and disposal.

The trash container supporting apparatus of the present invention has been described in respect to the particular embodiment thereof set forth in the specification and as illustrated in the drawings. As a result of such a disclosure, other variations and modifications may become apparent to those skilled in the art and therefore, no limitation as to the scope of the invention is intended by the specific embodiment disclosed but the scope of the invention is to be interpreted in view of the appended claims.

What is claimed is:

1. Trash container supporting apparatus for a plurality of trash containers permitting separation of different categories of trash for recycling purposes comprising:
   a trash container frame;
   a plurality of trash container supports each pivotally interconnected to the trash container frame and each adapted to support a trash container;
   an equal number of trash containers positioned within each trash container support and extending below their respective support and;
   a lower cross support at the lower extremity of the trash container frame against which the lowermost trash container engages when the trash container supporting apparatus is in the vertical position to maintain the trash container and those thereabove in an inclined position, whereby the trash container frame and included trash containers may be positioned between a generally vertical position for conservation of space and a generally horizontal position while the trash containers remain in a generally vertical position.

2. The trash container support apparatus of claim 1 wherein the trash container supporting frame includes wheel means permitting the frame and included containers to be easily moved from one location to another.

3. The trash container supporting apparatus of claim 1 wherein the trash container supporting frame is of a configuration such that the frame will be self-supporting when positioned in either a generally vertical or a generally horizontal position.

4. The trash container support apparatus of claim 3 wherein the trash container supporting frame includes wheel means permitting the frame and included containers to be easily moved from one location to another.

* * * * *